G. W. COOK.
Cultivator.
No. 79,956.
Patented July 14, 1868.
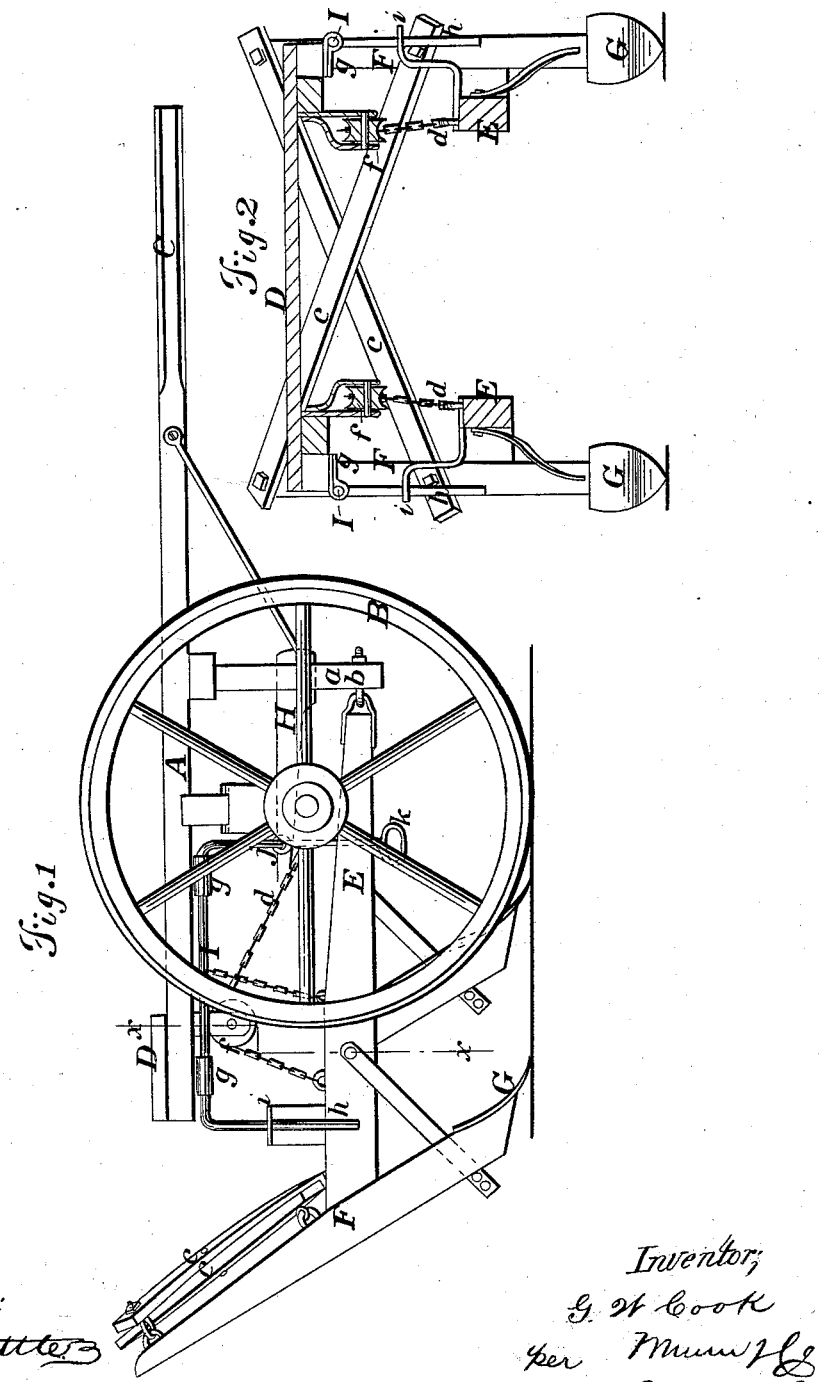
Witnesses:
W. C. Ashketter
Wm A. Morgan
Inventor:
G. W. Cook
per Munn & Co
Attorneys

UNITED STATES PATENT OFFICE.

GEORGE W. COOK, OF MACON, ILLINOIS.

IMPROVEMENT IN CULTIVATORS.

Specification forming part of Letters Patent No. 79,956, dated July 14, 1868.

*To all whom it may concern:*

Be it known that I, G. W. COOK, of Macon, in the county of Macon and State of Illinois, have invented a new and Improved Cultivator; and I do hereby declare that the following is a full, clear, and exact description thereof, which will enable others skilled in the art to make and use the same, reference being had to the accompanying drawings, forming a part of this specification.

This invention relates to a new and improved cultivator; and it consists in a peculiar construction and arrangement of certain parts, as hereinafter fully shown and described, whereby the driver may either walk or ride, as he may desire, and be capable in either case of operating equally the shares or shovels and managing the team.

In the accompanying drawings, Figure 1 represents a side view of my invention; Fig. 2, a transverse vertical section of the same taken on the line $x\ x$, Fig. 1.

Similar letters of reference indicate corresponding parts.

A represents a frame, which is mounted on two wheels B B, provided with a draft-pole, C, in front, and a driver's seat, D, on its rear end.

To the front end of the frame A there are attached two pendants, $a\ a$, to the lower parts of which there are connected by universal joints $b$ the front ends of plow-beams E E, which have a standard, F, attached to their rear ends, one to each. The lower standard, F, has a shovel or share, G, secured to it, and the upper parts of said standards above the beams E are connected by cross-bars $c\ c$.

To each beam E, near its rear part, there is attached a chain, $d$, and these chains pass over pulleys $f$, at the under side of the frame, and are secured to treadles H H within convenient reach of the driver on seat D. By this arrangement the shares may be readily raised out of the ground when required by depressing the treadles H.

To each side of the frame A there are attached two bearings, $g\ g$, in which shafts I are fitted and allowed to turn freely. The rear ends of these shafts are turned downward in crank form, as shown at $h$, and pass through holes in plate $i$, attached to the plow-beams. The front ends of the shafts I are also made or bent in crank form, as shown at $j$, and have springs $k\ k$, attached to receive the feet of the driver. By this means the beams E E, and consequently the shovels or shares, may be moved laterally to conform to the sinuosities of the rows of plants.

In case the driver prefers to walk behind the machine instead of riding, the cross-bars $c\ c$ serve as handles by which he can move the beams E E laterally and vertically without any trouble or difficulty whatever.

Having thus described my invention, what I claim as new, and desire to secure by Letters Patent, is—

The connecting of the standards F F of the plow-beams E E by cross-bars $c\ c$, as shown, in combination with the crank-shafts I I, chains $d$, pulleys $f$, and treadles H H, all arranged and applied to mounted frame A, substantially as and for the purpose set forth.

The above specification of my invention signed by me this 25th day of February, 1868.

GEORGE W. COOK.

Witnesses:
 MATTHEW RUBY,
 JOHN H. LOWELL.